(12) United States Patent
Kalkus et al.

(10) Patent No.: US 12,444,874 B2
(45) Date of Patent: Oct. 14, 2025

(54) ELECTRICAL CONNECTOR INSTALLATION ELEMENT WITH MOTORIZED CLOSURE MECHANISM

(71) Applicant: KK Technologie Gmbh & Co. KG, Rennerod (DE)

(72) Inventors: Berthold Kalkus, Rennerod (DE); Michael Konrad, Driedorf-Hohenroth (DE)

(73) Assignee: KK TECHNOLOGIE GMBH & CO KG, Rennerod (DE)

( * ) Notice: Subject to any disclaimer, the term of this patent is extended or adjusted under 35 U.S.C. 154(b) by 400 days.

(21) Appl. No.: 17/925,364

(22) PCT Filed: May 18, 2021

(86) PCT No.: PCT/DE2021/000094
§ 371 (c)(1),
(2) Date: Nov. 15, 2022

(87) PCT Pub. No.: WO2021/233491
PCT Pub. Date: Nov. 25, 2021

(65) Prior Publication Data
US 2023/0231335 A1    Jul. 20, 2023

(30) Foreign Application Priority Data
May 18, 2020   (DE) .......................... 102020002945.0

(51) Int. Cl.
*H01R 13/453* (2006.01)
*H01R 24/70* (2011.01)
(Continued)

(52) U.S. Cl.
CPC ......... *H01R 13/4532* (2013.01); *H01R 24/70* (2013.01); *H02G 3/14* (2013.01); *H02G 3/18* (2013.01)

(58) Field of Classification Search
CPC ... H01R 13/4532; H01R 13/4536; H02G 3/08
See application file for complete search history.

(56) References Cited

U.S. PATENT DOCUMENTS 9,300,120 B1    3/2016   Clough et al.
11,973,290 B2*  4/2024   Frank ..................... H01R 24/76
(Continued)

FOREIGN PATENT DOCUMENTS

CN          210272793          4/2020
DE       102007063585 A1       7/2009
(Continued)

OTHER PUBLICATIONS

PCT/DE2021/000094 International Search Report with Written Opinion dated Oct. 14, 2021.

*Primary Examiner* — Vanessa Girardi
(74) *Attorney, Agent, or Firm* — Ralph E. Jocke; WALKER & JOCKE

(57) ABSTRACT

An exemplary installation element for electrical connectors has a base housing in which at least one electrical plug socket is arranged, and an outer housing which has at least one through opening. A rotatable closure is arranged between the outer housing and the base housing. The installation element also has a drive motor and transmission which moves the closure linearly and rotationally, responsive to at least one control signal. The at least one through opening in the installation element can be opened and closed automatically without manual manipulation of the closure.

21 Claims, 10 Drawing Sheets

(51) Int. Cl.
*H02G 3/14* (2006.01)
*H02G 3/18* (2006.01)

(56) References Cited

U.S. PATENT DOCUMENTS

| | | |
|---|---|---|
| 2013/0171851 A1 | 7/2013 | Neukam et al. |
| 2014/0273563 A1 | 9/2014 | Baldwin et al. |
| 2016/0156123 A1 | 6/2016 | Yang |

FOREIGN PATENT DOCUMENTS

| | | | | |
|---|---|---|---|---|
| DE | 102012025533 A1 | | 6/2013 | |
| DE | 202015103222 | * | 7/2015 | ........... H01R 25/006 |
| DE | 202015103222 U1 | | 7/2015 | |
| DE | 102014102959 A1 | | 9/2015 | |
| DE | 102018009948 A1 | | 6/2020 | |
| KR | 100771211 B1 | | 10/2007 | |

\* cited by examiner

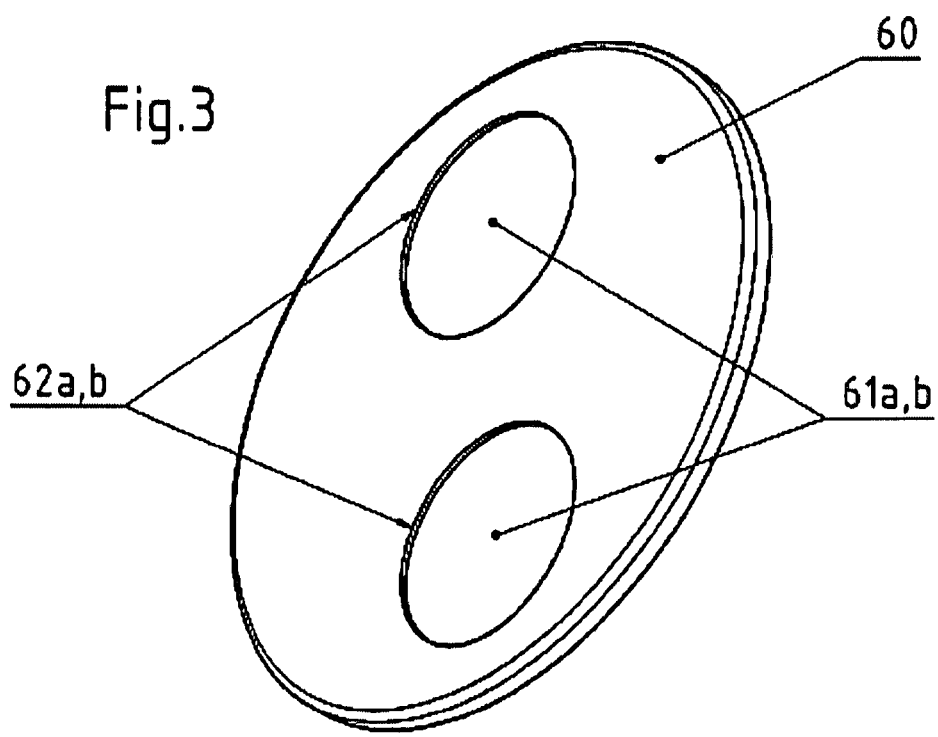
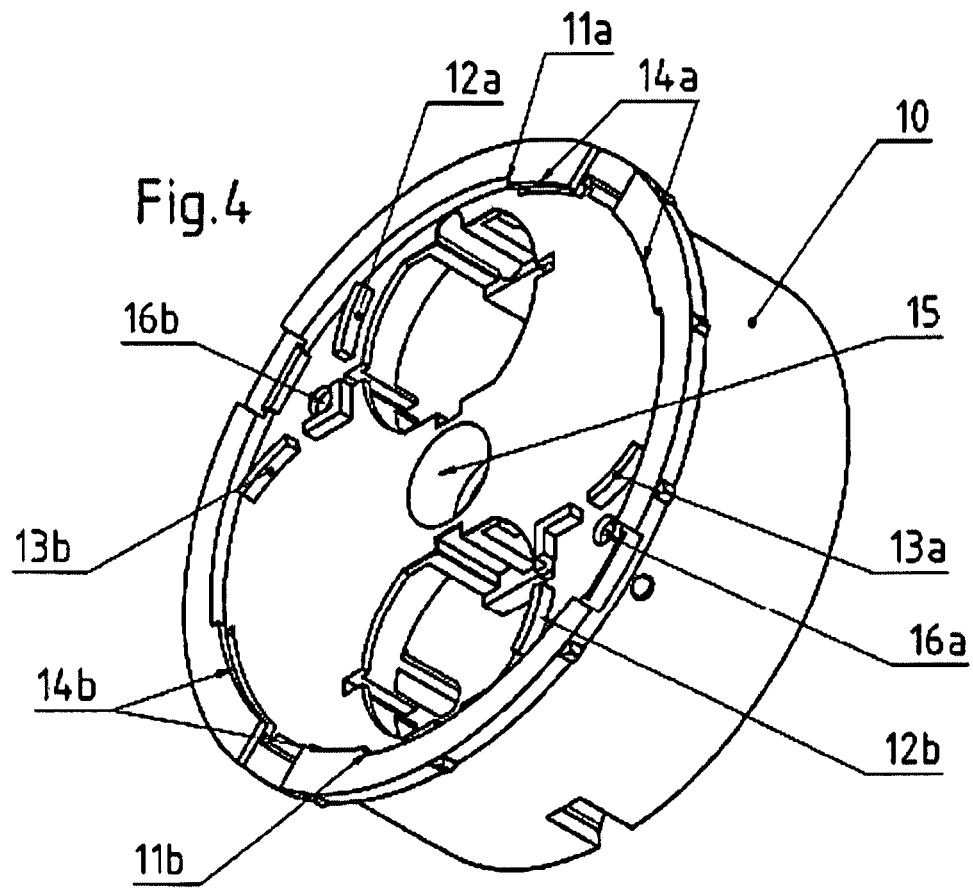

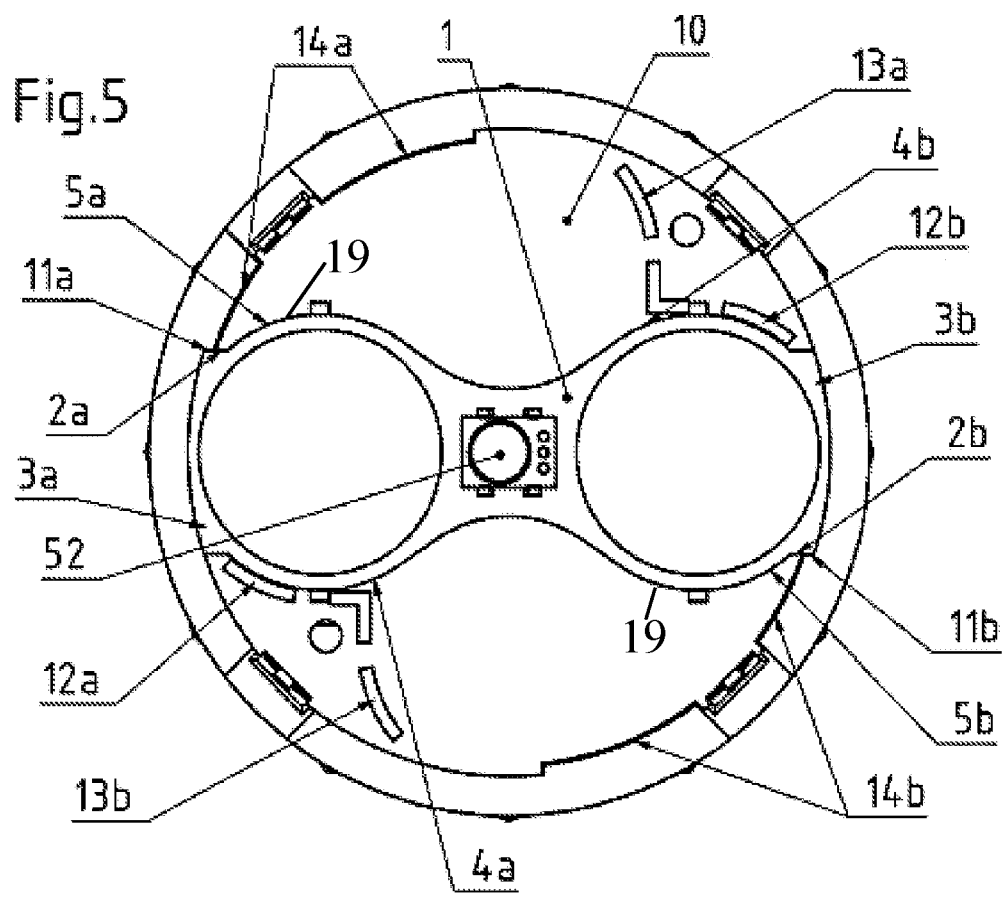
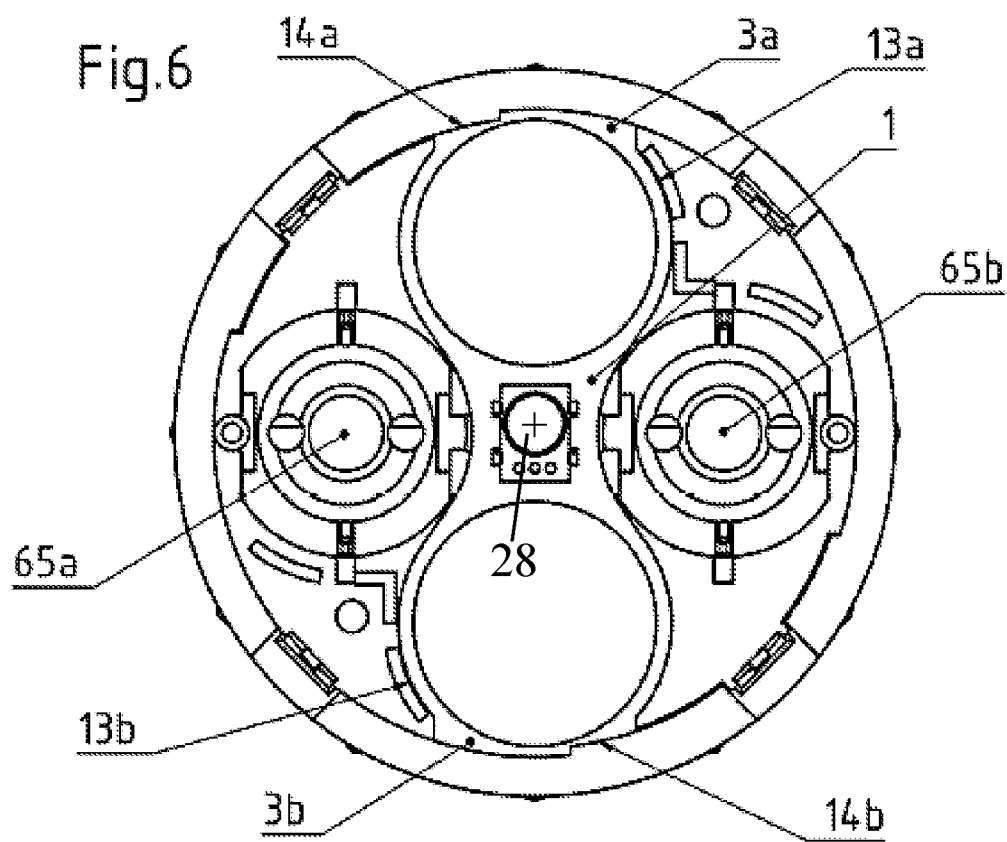

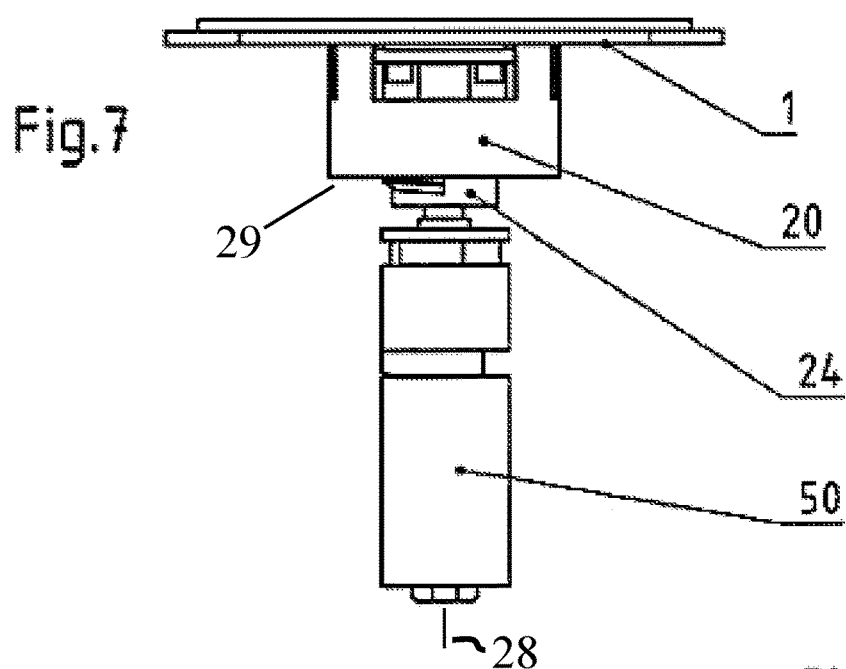
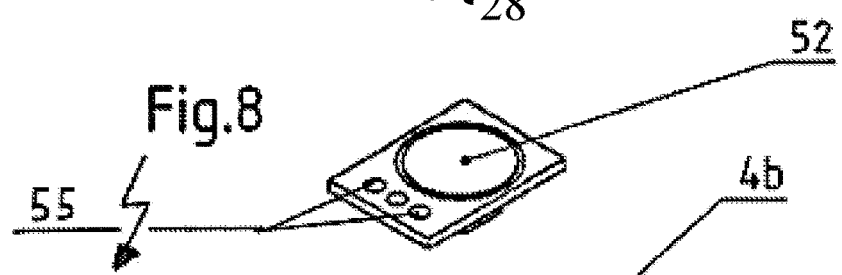
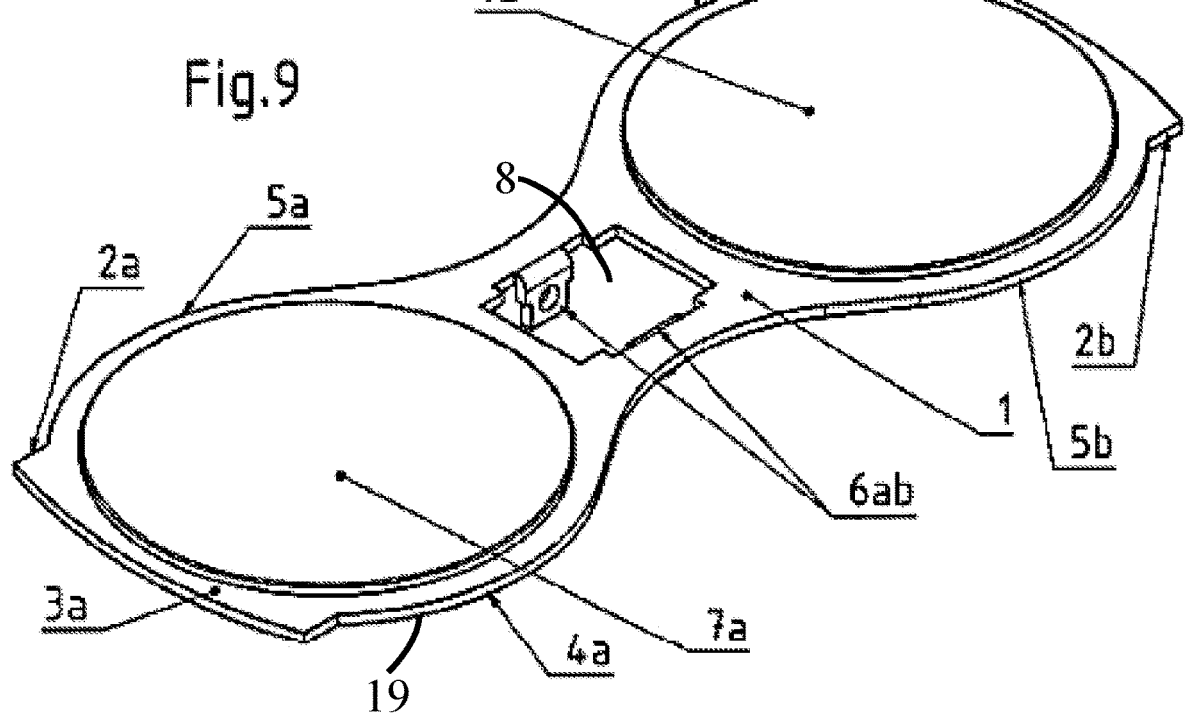

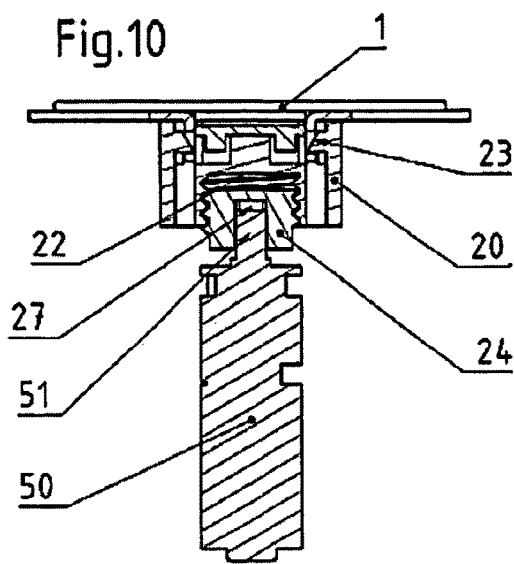
Fig.10
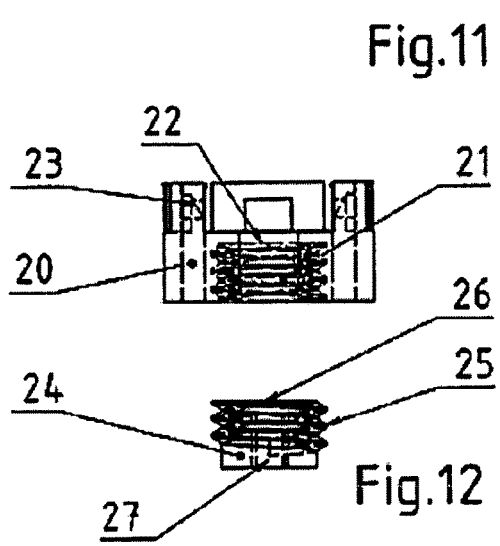
Fig.11
Fig.12
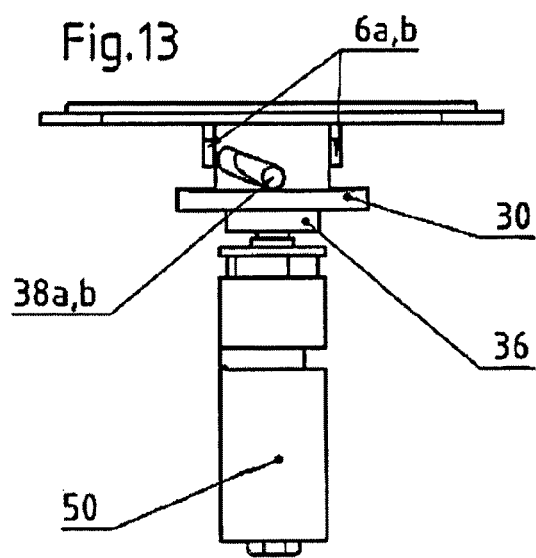
Fig.13
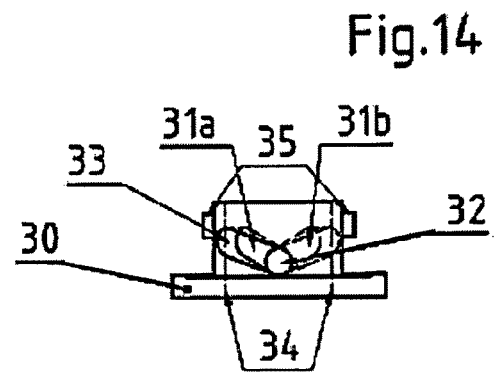
Fig.14
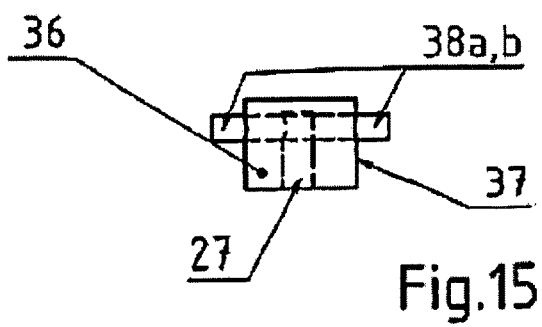
Fig.15

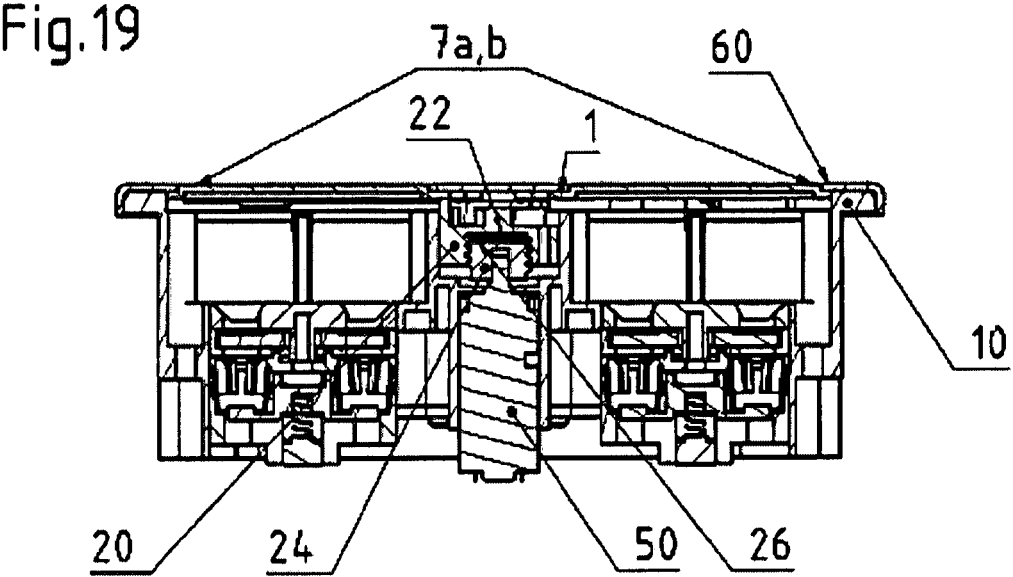
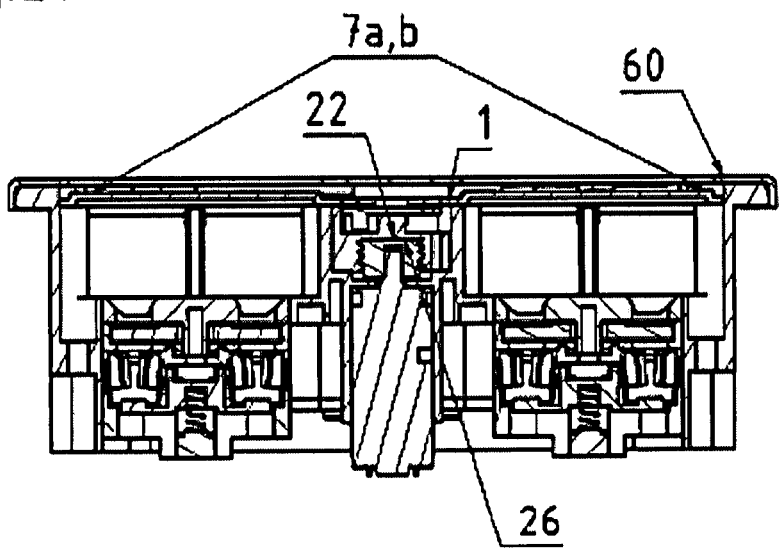

ELECTRICAL CONNECTOR INSTALLATION ELEMENT WITH MOTORIZED CLOSURE MECHANISM

TECHNICAL FIELD

Exemplary arrangements relate to an installation element for electrical connectors having a housing including a base housing in which at least one electrical plug socket is arranged, and an outer housing having at least one through opening, with a rotating closure being arranged between the outer housing and the base housing.

BACKGROUND

Electrical connector installation elements are mainly used in the field of office and kitchen electrification. These may be single-way or multi-way sockets that are recessed into the work surface. In some prior arrangements, the sections of the plug socket outlets in the unused plug socket units are covered or closed. When the plug sockets are to be placed in use, the sections of the socket outlets are made accessible by manually pressing down a mechanical assembly arrangement. In other arrangements it is also common to release the engaging parts of the plug sockets by manually lifting or moving a cover sideways or twisting it.

Document DE 10 2014 102959.3 A1 describes a device in which a socket insert with insertion slots is provided in such a way that an inner housing can be rotated by at least 180° about its longitudinal axis. In order to release the insertion slots, the inner part of the housing must be pressed into the assembly using the fingers on its outer edges. In this case, a cardioid locking is effected against the pretension of a torsion spring and the inner part can rotate into the operating position. When closing, the inner housing must then be manually pressed into the locking position by 180° against the pressure of the torsion spring and the damping element and snapped into the cardioid locking mechanism.

Document DE 10 2007 063 585.2 A1 describes an electrical plug socket with a device mount on the front, in the surface of which a closure based on the shutter principle of a camera, is integrated. The closure consists of a plurality of closure elements which are guided through fixed mountings and can be moved radially inwards and outwards. Locking and opening is carried out by operating a swivel on the front of the plug socket housing.

Document DE 10 2012 025 533.0 A1 discloses a plug socket arrangement with the following function. The closure is pushed into the socket housing with the finger by means of a control button, which is positioned centrally, against the pressure of the retaining spring. The control button protrudes into the cover and unlocks the cover and must be held in this position with the finger. The cover, which is rotationally mounted on the base housing, can then be turned by hand—while simultaneously pressing the closure down—and thus opens up the access to the socket outlets. The plug sockets are also closed with the reverse direction of rotation of the cover.

In DE 10 2018 009 948.3 A1 also, the centrally arranged control button is manually pushed into the housing by pressing a control element down against the pressure of a compression spring. Pressing down with a finger causes an internally arranged lock to be unlocked to allow the closure to rotate. At the same time, when the control button is pressed down, a switch spring is pushed onto a switch key, thereby closing a circuit which then causes an electric motor to rotate.

Further exemplary embodiments described in DE 10 2018 009 948.3 A1 relate to a centrally arranged control button, which must be inserted into the housing with the finger in order to open the closure.

Common to these prior technical solutions is that the mechanical elements allow access to the plug socket by turning them by hand or by pressing down an actuating element with a finger. Essentially, a skillful handling of the control elements is required to initiate the desired operation. The interior areas of these prior solutions are also exposed to greater contamination due to the gap dimensions in the arrangement of the control elements. The degree of contamination can adversely affect the operation of the control element and lead to malfunctions. Equally, the different force applied to the control element by different operators is detrimental to the proper operation of the mechanical sequence.

A further limitation of the prior solutions is the user-friendliness, which is adversely affected by the requirements for user intervention in the housing. This is a problem in particular when the control element must be pushed into a housing against spring pressure, which can cause damage to longer fingernails or a clamping force of the control element can be exerted on the finger.

Electrical connector installation elements may benefit from improvements.

SUMMARY

Exemplary arrangements provide an electrical connector installation element with an internal plug socket, that opens and closes the closure without actuating mechanical controls by hand or with the fingers.

An exemplary installation element for electrical connectors provides selective access to at least one electric plug socket, for example plug sockets of different designs for household current, as well as plug sockets for USB or other connectors. The exemplary electrical connection installation element has a housing with an outer housing with openings as well as a base housing with one or more plug sockets mounted under the outer housing. Various options for the operating principles according to the exemplary arrangements of a closure of the sockets are described below.

The exemplary outer housing is fixedly connected to the base housing. One or more through openings are provided in the outer housing to allow access to the plug sockets. These through openings provide insertion holes sized for the connectors or plugs of consumers and are equivalent in number to the number of plug sockets installed within the base housing. In some exemplary arrangements more than one plug socket can also be assigned to one through opening.

Furthermore, an exemplary element has a rotatable closure that can be used to open or close the above-mentioned through openings of the outer housing. The exemplary rotatable closure is arranged between the outer housing and the base housing and in some exemplary arrangements may include a rotary disc or a partial disc. As an alternative to the rotary disc, the rotatable closure in other exemplary arrangements may have other configurations, for example as a rotary knob, or the like.

The exemplary closure can be rotated about an axis in the base housing. The individual plug socket devices are positioned in the fixed base housing such that they are aligned with and correspond exactly to the corresponding openings in the outer housing. When the closure is in the open position the corresponding plugs or connectors of the consumers can be inserted into engagement with the sockets. The outer housing and the base housing are fixed together so that only the closure can be rotated.

In order to create a flat surface in the closed position of the closure, the projections of the closure that are aligned with the through openings, are embossed with through opening engaging portions that are configured in a complementary manner to the openings of the outer housing. In the closed position of the closure, each through opening engaging portion extends in a respective through opening of the outer housing from the inside to the outside. Thus, in exemplary arrangements, the openings of the outer housing are closed and the outer surface extends in a planar manner.

The rotational ability of the closure can be initiated by differently generated control signals and can be achieved by different rotary mechanisms referred to herein as motors. The operation of exemplary arrangements is based on a consistent sequence of mechatronic operating principles, which ensure that the closure can be rotated and axially moved between open and closed positions without having to perform a mechanical actuation by hand.

In a first exemplary arrangement, a control signal can be generated by a touch sensor according to the following principles. The exemplary control circuit includes a sensor that is arranged on a circuit board which is connected to the metal outer housing by means of a cable connection. Touching the metal surface of the outer casing, at any point, with a finger or palm of the hand, causes a change in the field. This electric field change is detected by an IC circuit on the circuit board and the circuit is operative to generate at least one control signal.

A second exemplary arrangement uses an electric field sensor that is positioned at a defined point in the base housing, with a complementary marking placed on the outer housing, above the electric field sensor. This allows an electric field change to be generated in a contactless manner by simply moving the hand over the sensor at a slight distance. This field change also causes at least one control signal to be generated as in the first exemplary arrangement. The difference from the first exemplary arrangement is that the hand does not need to touch the outer housing, but only has to be brought close to a defined area.

At least one control signal can also be generated in response to an optical sensor responsive to a change in detected light. For this purpose, in an exemplary arrangement an opening is formed in the outer housing and closed off with a light-permeable material. The opening can also be a material weakening such as a lesser thickness that allows light to pass through the material. Below and underlying this opening, a light sensor is placed which registers a sudden light-dark change and causes a circuit to generate a control signal via an IC element. The sudden light-dark change may be generated by a finger that is passed over the closed opening. It is also possible in other exemplary arrangements to have a spherical lens cap that divides the opening in the outer housing into light corridors, registers a light-dark change and causes the circuit to generate a control signal by means of evaluation electronics.

It is also possible in exemplary arrangements to generate a control signal by means of a predefined acoustic input. In this exemplary arrangement, a circuit board with voice module circuitry equipped with a microphone and an IC processor stores the data that corresponds to acoustic signals representing the phonetic input of words such as "Open" or "Closed" and, by means of comparisons, assign a digital value to the analogue sound images, which provides a control signal by means of an IC circuit.

In a modified exemplary arrangement, the "Smart Home technology" can also be used by integrating a sensor that can be coupled with the smart home systems into the base housing and by receiving the input smart home commands, usually an infrared signal or a radio frequency (RF) signal, and generating at least one control signal. This means that the exemplary installation element can also be integrated into a smart home system.

All of the above-mentioned exemplary electrical connector installation elements, which cannot be manually mechanically actuated, have the common characteristic that responsive to at least one input a control signal is generated and that this signal can be sent to the motor or other control electronics of the installation element to cause operation thereof.

A function of the exemplary motor or other drive unit is to move the closure underneath the outer housing in an axial linear movement away from the outer housing until the surface of the through opening engaging portion of the closure has sunk below the inner surface of the outer housing, and then to rotate the closure out of intermediate relation of the through openings for the plug guidance and the sockets by means of a rotational movement. This means that the axial then rotational movement of the closure opens up access to the plug sockets such that the closure changes from the closed position to the open position. In the reverse operation of the closure, the drive unit rotates the closure by means of a rotational movement into the complementary position of the closure in which the projections are aligned with respect to the through openings of the outer housing, then by means of axial linear movement, the closure moves outward with the through opening engaging portions moved into the openings of the outer housing until a plane overall outer surface of the outer housing is created. This closes off the openings for the plug sockets as the closure moves to the closed position.

This combination of linear and rotational motion of the closure of the exemplary arrangement can be accomplished in different ways.

One possible option for a motor consists of a direct-current electric motor, which is fed from the electrical circuit inside the electrical connection installation element. The electric motor is stationary in the base housing and has a transmission including a movement gear system operatively between the drive shaft of the motor and the rotatable closure element. The exemplary movement gear system includes a drive swivel connector that is operatively connected to the axle of the electric motor and a movement sleeve that is fixedly connected to the closure. The exemplary drive swivel connector is shaped with diametrically arranged pins that protrude over the cylindrical surface of the drive swivel connector. The exemplary transmission includes a swivel that enables closure rotation in a direction transverse to the axis of closure rotation between the open and closed positions. The exemplary movement sleeve is provided with helix slot structures that penetrate the wall of the movement sleeve from the outer cylinder surface toward the center of the axle. The pins in operative connection with the drive swivel connector are arranged complementary to the helix slot structures of the movement sleeve and engage in the helix slot structures and create a movable axial connection to the closure.

In its closed position, the exemplary closure rests against a support wall which serves as a closed position stop, which prevents the closure from turning when an external rotation force is applied to it.

When moving from the closed position to the open position in this exemplary arrangement the axle of the electric motor rotates, the drive part with its shaped pins rotates in the motion sleeve by the same amount. The pins press on the track of the helical slot structures of the movement sleeve, and pull the closure linearly axially into the base housing of the installation element. At least one release stop and the helical slot structures are matched such that when a sufficient linear axial lowering of the closure is reached, an inner guide end of the support wall which serves as a release stop is reached and the movement sleeve and closure can now rotate in the same rotational direction due to the rotating pins of the drive swivel connector. This causes the closure to be first moved axially inward and then rotated out of intermediate relation of the through openings for the plug guidance and the sockets. This means that the closure opens up the access to the plug sockets. When the closure reaches its opening position, the stop ribs which serve as an open position stop, bring the rotation of the closure to a standstill. With the closure held stopped a rise in current takes place in the electric motor and the exemplary control circuit switches off the power supply for the motor and initiates the polarity reversal of the electric motor.

During the exemplary closing operation from the open position, the motion sleeve is first set into rotation by the drive motor and the swivel connector, which now rotates with the reverse direction of rotation, and the closure is rotated into engagement against a stop rib which serves as a closed position stop in the reverse direction of rotation. The electric motor with its drive swivel connector continues to rotate and causes the closure via the pins in the helix slot structure and the movement sleeve moves linearly axially outwards so that the closure comes to rest against the inside of the outer housing. The closure also moves axially outward and into adjacent relation with the release stop. When the end of slot travel is reached, the current consumption is increased again and the current is switched off by the exemplary control circuitry and the electric motor polarity is reversed.

A further exemplary arrangement has some features similar to the previous described exemplary arrangement, wherein here also a transmission including a drive swivel connector and a movement sleeve are arranged in the same way. In contrast to the first described exemplary arrangement, the pin structures in the drive swivel connector and the helix slot structure in the motion sleeve are not used. These are replaced in an exemplary arrangement by a threaded member including an external thread in the drive swivel connector and by an internal thread in the movement sleeve.

In this exemplary arrangement with the closure in the closed position turning the drive axle of the electric motor the drive swivel connector is screwed into the movement sleeve. During such axial movement the closure cannot be rotated at first due to engagement with the support wall that serves as a release stop. The movement sleeve axially pulls the closure into the inside of the housing. When a sufficient linear axial lowering of the closure is reached, the guide end of the release stop/support wall is also reached and the movement sleeve and closure member now starts to rotate. As in the first exemplary arrangement described above, the rotation of the closure is stopped by engagement of a stop rib which serves as an open position stop, and the power supply to the electric motor is interrupted in the same way by the exemplary circuitry and the electric motor polarity is reversed. Due to the higher current supplied, the movement sleeve is tightened on the drive swivel with a holding torque.

During the closing operation of the closure from the open position, the closure rotates in the opposite direction of rotation and also runs towards the stop rib which serves as a closed position stop. The stop causes a higher current consumption and the holding torque is released and the drive rotating part rotates out of the movement sleeve, causing axial movement of the closure. The closure is moved and pressed linearly axially outward with the closure against the inside of the outer housing. In this position the through opening engaging portions of the closure projections extend in the through openings. When the stop preventing further outward axial movement is reached, the current consumption is increased again and the current is switched off by the control circuitry and the electric motor polarity is reversed.

Alternatively, the following motor and transmission arrangement can be implemented: the electric motor has an axially movable steel axle which is surrounded by the windings of the electric motor so as to serve as a solenoid. The axle is spring-mounted in the electric motor and is operatively connected to the closure at the external end. In the closed position of the closure, when the motor is switched on via the control signal, the magnetic solenoid action of the windings on the steel axle of the electric motor causes the steel axle to move linearly axially into the motor against the spring action and thus the fixedly connected closure is drawn linearly axially into the base housing. When the bottom dead center of the axle is reached, the electric motor starts to rotate the axle and the closure rotates into its open position. As already mentioned above, the engagement with the open position stop causes an increase in current, which causes the exemplary circuitry to switch off the motor and reverses its polarity. Likewise, when the closure is moved from the open position to the closed position, the electric motor rotates the closure into the position of the closure in abutting position against a stop rib which serves as a closed position stop. Due to the current increase, the exemplary circuitry causes the electric motor to be switched off and its polarity reversed. The switch-off also shuts off the magnetic field and the closure is moved outward axially linearly into the outer housing by the compression spring in the electric motor by means of the steel axle and the electrical connector installation element is thus closed.

Of course it should be understood that these arrangements are exemplary and that other arrangements may be used.

BRIEF DESCRIPTION OF DRAWINGS

FIG. 3 shows the exemplary outer housing in an isometric view with both through opening holes.

FIG. 4 shows the exemplary base housing in an isometric view.

FIG. 5 shows the base housing without the outer housing and with the exemplary closure in the closed position in a plan view.

FIG. 6 shows the base housing without the outer housing and with the closure in the closed position in a plan view.

FIG. 7 shows an exemplary closure assembly in a side view with an exemplary movement sleeve, drive swivel connector and drive motor.

FIG. 8 shows an exemplary sensor circuit board in an isometric view and as a single part.

FIG. 9 shows the exemplary closure in an isometric view as a single part.

FIG. 10 shows an exemplary closure assembly in a side cross sectional view with an exemplary movement sleeve, drive swivel connector and drive motor.

FIG. 11 shows the exemplary movement sleeve of FIG. 10 with a screw thread in a side view.

FIG. 12 shows exemplary threaded element of the exemplary drive swivel connector with thread in a side view.

FIG. 13 shows an alternative closure assembly with helix slot structure in a side view with an exemplary movement sleeve, drive swivel connector and drive element.

FIG. 14 shows the exemplary movement sleeve with helix slot structure of FIG. 13 in a side view.

FIG. 15 shows the exemplary drive swivel connector with helix slot structure of FIG. 13 in a side view.

FIG. 19 shows a cross section through the middle of an exemplary installation element in a closed position.

FIG. 20 shows a cross section through the middle of the exemplary installation element with the closure lowered.

DETAILED DESCRIPTION

Figure 1:
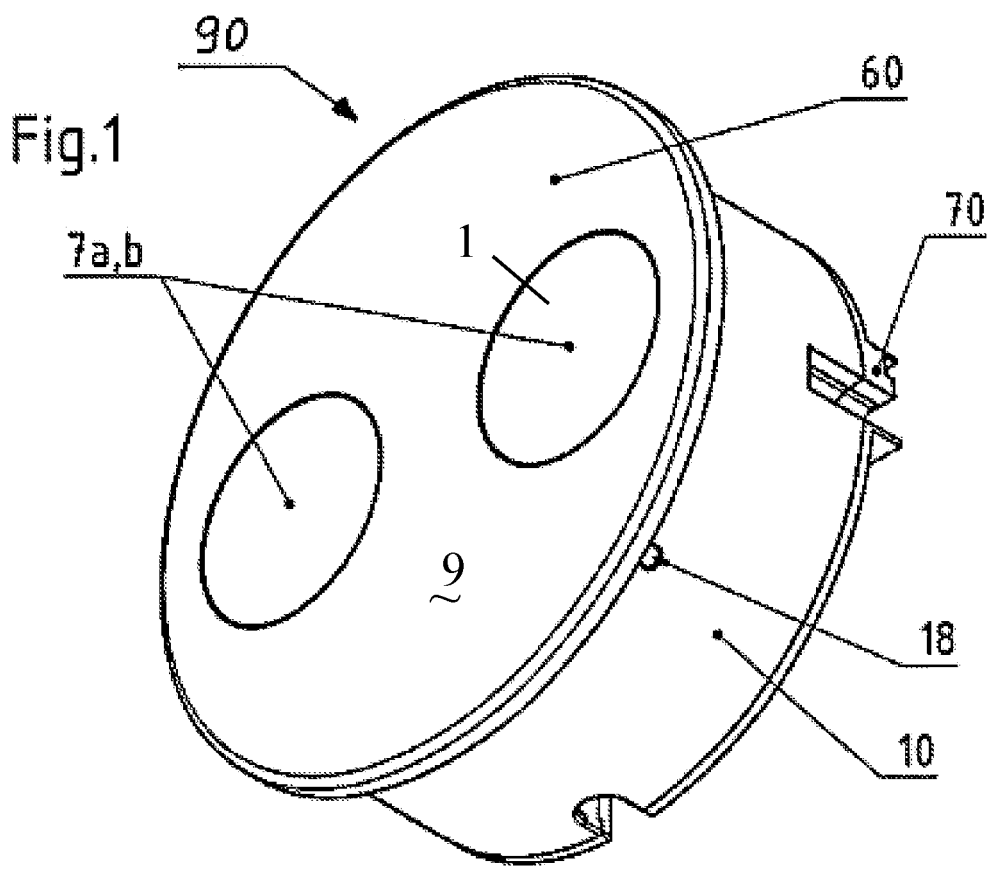
FIG. 1 shows an exemplary electrical connector installation element in the closed condition in an isometric view.

FIG. 1 shows an exemplary apparatus comprising an electrical connector installation element 90 as a complete assembly in an isometric view. The installation element shows a closure 1 in a closed position, wherein the through opening engaging portions 7 (a, b) of the closure 1 form a generally continuous plane surface with respect to the outer surface 9 of the outer housing 60. The exemplary outer housing 60 is stationarily fixed to the base housing 10, which base housing is closed from below with a housing bottom 70. The outer housing and base housing together comprise the housing of the installation element. The entire assembly has no mechanical actuators that initiate the opening or closing of the closure responsive to manual engagement such as by pushing down or pulling an actuator out by hand.

Figure 2:
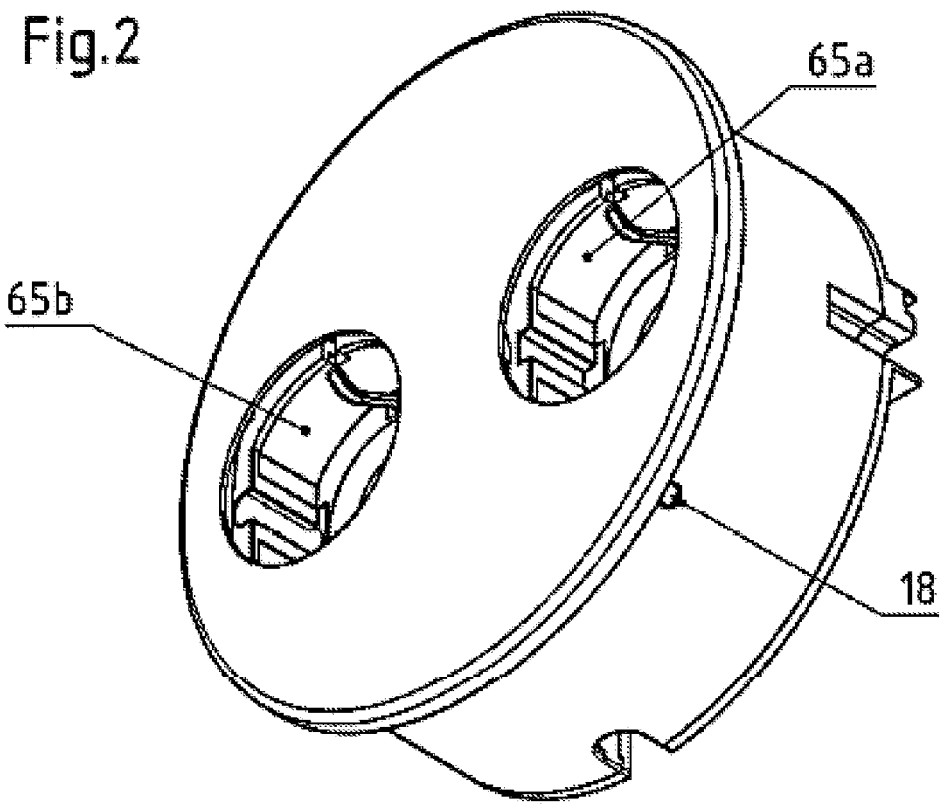
FIG. 2 shows the exemplary installation element in the open condition in an isometric view.

FIG. 2 shows the installation element as a complete assembly in an isometric view. The installation element is shown with the closure in an open position, with the through openings 61 (a, b) of the outer housing 60 providing free access to the plug socket inserts 65 (a, b) which are alternatively referred to herein as electrical plug sockets. The surface edge 62 (a, b) is the outer upward facing boundary of the socket geometry and defines, among other things, the height of the opening engaging portions 7 (a, b) of the closure 1, so that a plane overall surface is obtained in the closed position of the closure across the outer surface 9 with the opening engaging portions extending in the through openings 61 (a, b).

FIG. 3 shows the exemplary outer housing 60 as a single part with the openings 61 (a, b) and the opening edges 62 (a, b).

FIG. 4 shows the exemplary base housing 10 as a single part in an isometric view. The upper base surface shows the stop ribs for limiting the rotation of the closure 1. The stop surfaces 11 (a, b) are the side faces of the guide rib 14 (a, b) and serve as at least one release stop. These stop surfaces guide the closure 1 during the linear axial downward movement away from the closed position. The stop ribs 12 (a, b) and 13 (a, b) limit the rotation of the closure 1. The rotation of the closure during opening is limited by the pair of ribs 13 (a, b) which serve as at least one open position stop. The rotation of the closure 1 during movement from the open position to the closed position is limited by the pair of ribs 12 (a, b) which serve as at least one closed position stop. A guide recess 15 in which the movement sleeves of an exemplary transmission arrangement are mounted is arranged axially centrally. The through holes 16 (a, b) are provided for routing cables to the outer housing 60.

FIG. 5 shows the exemplary installation element with the closure 1 and without the outer housing 60 in the closed position in a plan view. The exemplary closure is semi-circular and includes a pair of projections 19 that extend outward in opposed directions from an axis 28. The closure 1 in the closed position rests with its stop surfaces 4 (a, b) against the stop ribs 12 (a, b) which serve as a closed position stop. In this position the stop faces 2 (a, b) of the closure 1 are located opposite the stop surfaces 11 (a, b) of the base housing 10 with a small gap. Stop surfaces 11 (a, b) serve as a release stop. The guide surfaces 3 (a, b) of the closure 1 are exposed in the base housing 10. In the center of the exemplary closure a sensor circuit board 52 including circuitry is arranged.

FIG. 6 shows the installation element with the closure 1 and without the outer housing 60 in the open position in a plan view. The closure 1 now rests with the stop surfaces 5 (a, b) on the stop ribs 13 (a, b) of the base housing 10 which serve as open position stops. The guide surface 3 (a, b) of the closure 1 is partially covered by the guide rib 14 (a, b) of the base housing 10 which arcuate rib guide extends axially intermediate of the closure and the outer housing. The socket inserts 65 (a, b) are thus freely accessible in the assembly in the closure open position.

FIG. 7 shows an example of a drive mechanism as a sub-assembly in a side view. This sub-assembly consists of the closure 1 which is fixed in rotatable connection with a transmission 29 that includes a movement sleeve 20. The drive swivel connector 24 protrudes into the movement sleeve 20 such that it is coupled in turn to an electric drive motor 50 via an axial connection.

FIG. 8 shows a sensor circuit board 52, which includes circuitry which can be implemented in a wide variety of designs and can occupy different positions in the overall module of the installation element.

FIG. 9 depicts the exemplary closure 1 with its functional elements as a single part in an isometric view. The outline of the closure 1 results from the projections 19 with complementary stop surfaces 4 (a, b) and 5 (a, b) as well as the radially outward extending guide surfaces 2 (a, b) and 3 (a, b) and from the through opening engaging portions 7 (a, b) for a plane overall surface. A shaped body opening 8 for a sensor circuit board 52 is provided centrally, in which 2 mounting tabs 6 (a, b) extend.

FIGS. 10 to 12 show the individual parts of exemplary drive mechanisms and the module assignment in cross section, using a transmission that utilizes the operating principle of a threaded connection with at least one threaded member. The movement sleeve 20 is connected to the closure 1 by means of the connecting pins 23 (a, b) and the mounting tabs 6 (a, b) so as to provide a swivel that enables closure rotational movement in a direction transverse to the axis 28. In the interior of the movement sleeve 20, an internal thread 21 is formed. The stop surface 22 of the movement sleeve 20 is located at the inner end of the internal thread 21. Complementary to the internal thread 21, the drive swivel connector 24 has an external thread 25 and at the upper end also, a stop surface 26 and an internally formed opening, which is designed as a receiving hole 27 for the rotational axle 51 of the electric motor 50.

FIGS. 13 to 15 show the individual parts of an alternative drive mechanism and the assembly in a side view, using a transmission with the operating principle of a helical slot helix structure 31 (a, b) in the motion sleeve 30. The closure 1 is also attached via its mounting tabs 6 (a, b) and the connecting pins 35 (a, b) of the movement sleeve 30 to provide a swivel. Each helix slot structure 31 (a, b) has a top dead center 33 and a bottom dead center 32. The exemplary movement sleeve 30 is cylindrically shaped in the interior and thus forms a guide surface 34 for a drive swivel connector 36. The drive swivel connector has a cylindrical external shape 3 and is designed with two diametrically arranged cylindrical pins 38 (a, b), which engage in the helical slot structures 31 (a, b) in the drive transmission assembly. This drive swivel connector 36 also has an internally formed opening which is designed as a receiving hole 27 for the rotational axle 51 of the electrical motor 50.

Figure 16:
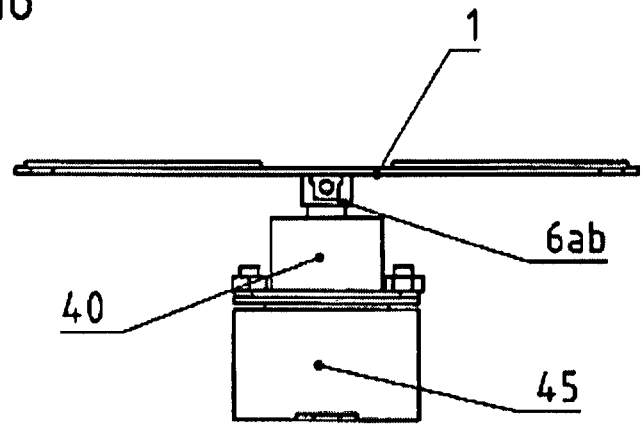
FIG. 16 shows a further exemplary closure moving assembly in a side view, as an example in a combination of a solenoid and rotary magnet.
Figure 17:
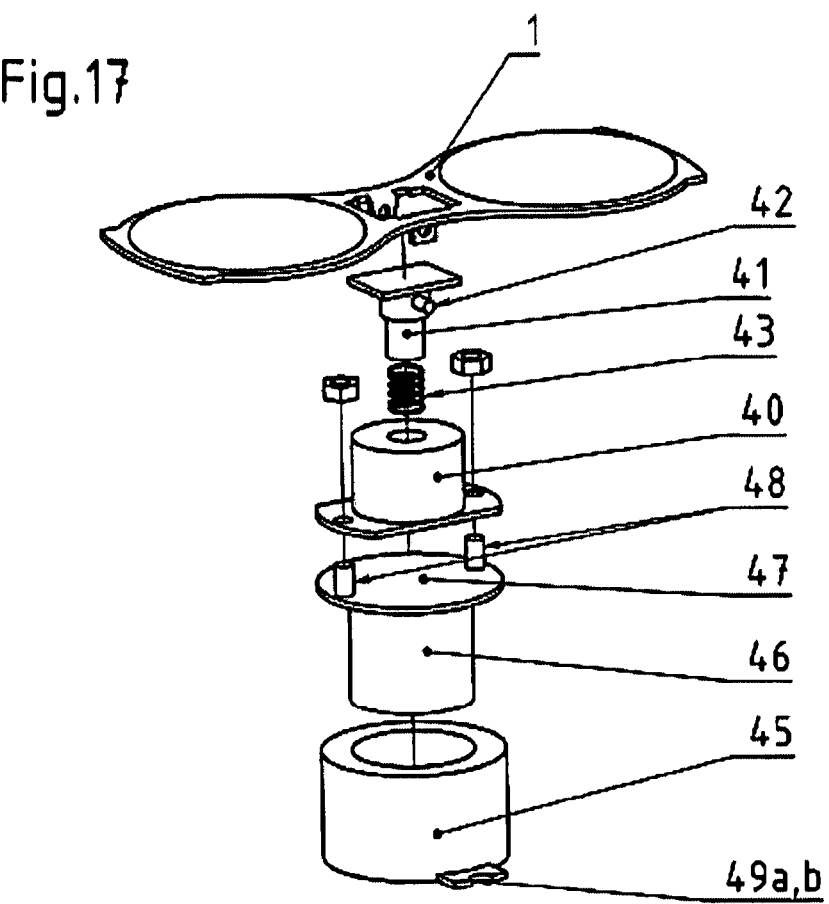
FIG. 17 shows the exemplary closure assembly of FIG. 16 including the solenoid and rotary magnet in an exploded view.

FIGS. 16 and 17 illustrate an alternative drive mechanism on the basis of a motor/transmission that includes a combined solenoid/rotary magnet technique in the side view and an exploded view. The side view shows an alternative design in which the closure 1 with its swivel including mounting tabs 6 (a, b) and the connecting pins 42 of the pull rod 41 of the solenoid 40 provide a positive-engaging fit. A rotary magnet 45 is arranged underneath the solenoid 40. In the exploded view, the schematic structure of this drive mechanism is shown in more detail. In this case, the solenoid essentially consists of the coil body 40 in the center of which a pull rod 41 is arranged, which is drawn into the coil body 40 against a compression spring 43 when current is applied. The solenoid 40 is fixed by means of fastening elements 48 to a connecting plate 47, which in turn is operatively connected to the rotating body 46. The rotating body 45 is positioned centrally in the outer body of the rotary magnet 45 such that it can rotate. Mounting tabs 49 (a, b) are formed on the outer body of the rotary magnet 45, which secure the outer body of the rotary magnet 45 to the base housing 10.

Figure 18:
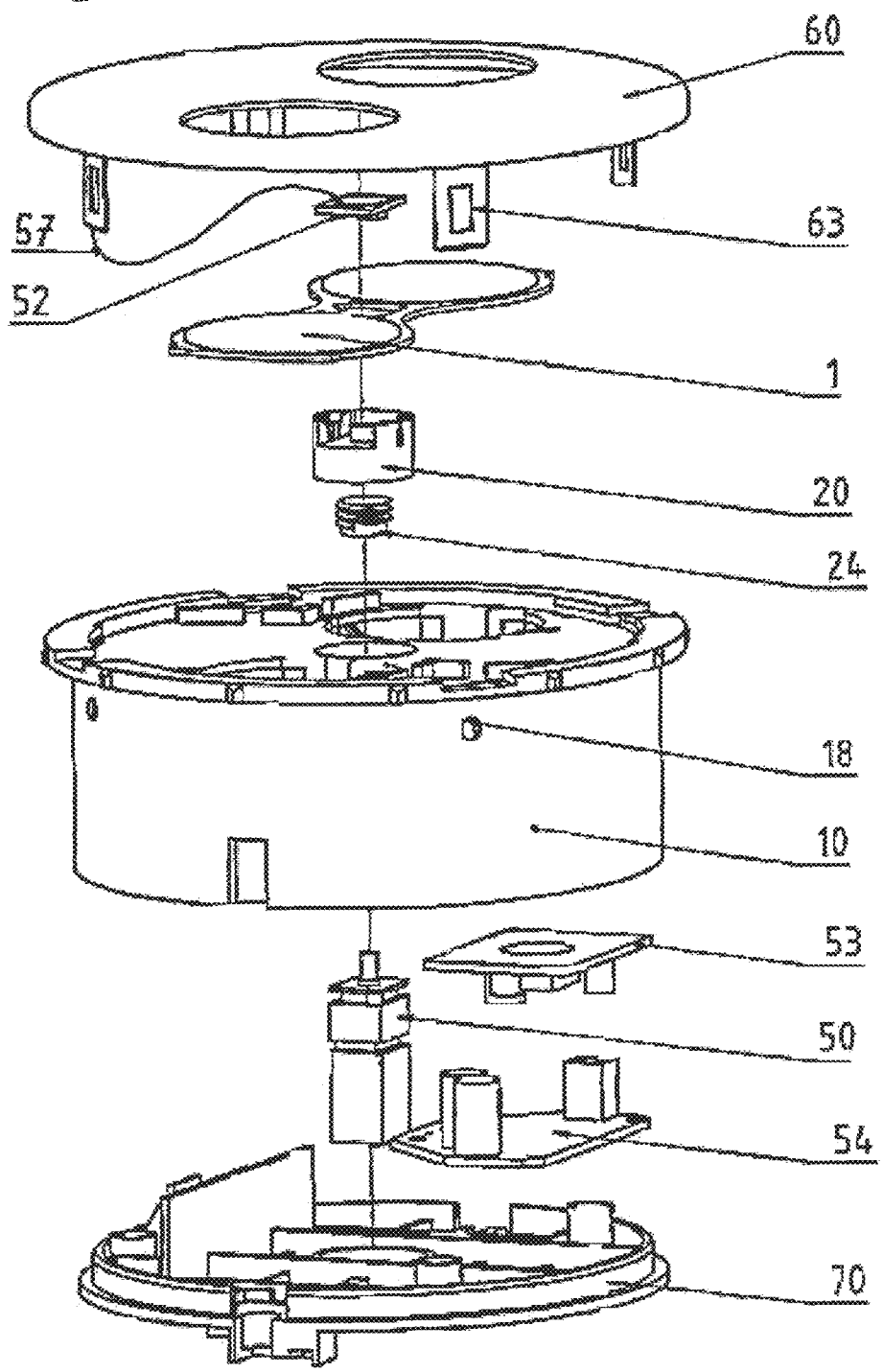
FIG. 18 shows an exemplary electrical connector installation element in an exploded view.

FIG. 18 shows the exemplary structure of an electrical connector installation element in its entirety based on an exemplary arrangement in an exploded diagram. The base housing 10 and the outer housing 60 when assembled form a housing with an interior area cavity in which the closure 1 can execute its linear axial and rotational movement by means of the motor and transmission such as the movement sleeve 20 and the drive swivel connector 24. A sensor circuit board 52 with suitable circuitry can be provided in a central position. Inside the base housing 10 are the plug engageable sockets which include socket inserts 65 (a, b), the electric motor 50 and further sensor circuit boards 53 as well as the motor control circuit board 54. The end of the housing is formed by the bottom of the housing 70.

FIGS. 19 and 20 illustrate the exemplary installation element in cross section, with FIG. 19 illustrating the installation element in the closed position of the closure 1. In this case, the outer surfaces of the through opening engaging portions 7 (a, b) are plane-parallel with the outer surface 9 of the outer housing 60. A gap is present between the stop surface 22 of the movement sleeve 20 and the stop surface 26 of the drive swivel connector 24. FIG. 20 shows the linearly lowered position of the closure 1, wherein the surfaces of the through opening engaging portions 7 (a, b) have been moved axially from the closed position and lowered below the level of the inside of the outer housing 60. The stop surface of the movement sleeve 22 and the stop surface 26 of the drive swivel connector 24 move together.

Figure 21:
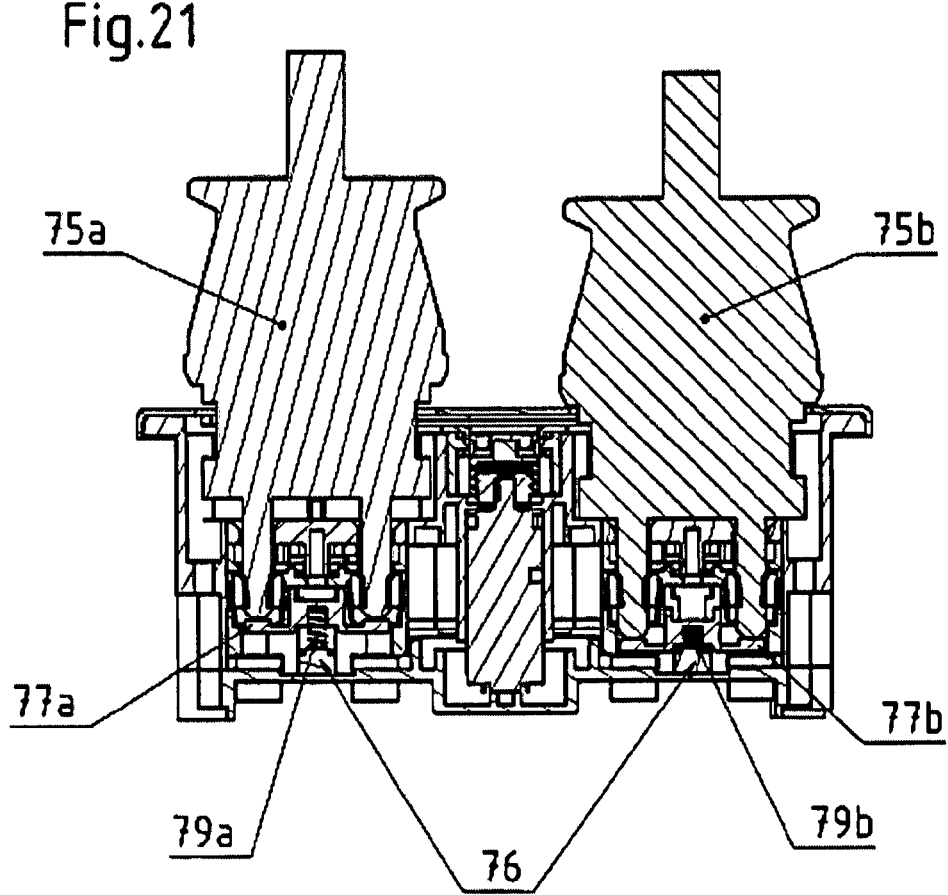
FIG. 21 shows a cross section through the middle of the exemplary installation element with two plugs inserted.

FIG. 21 illustrates the exemplary installation element in cross section with two inserted plugs 75 (a, b) which engage in the socket inserts 65 (a, b) at different heights. The plug 75a just touches the pressure surfaces 78 (a, b) of the switch plunger 77a, so that the compression spring 79a rests on the electric microswitch 76 with a slight pre-tension. The plug 75b indicates the end position of the fully inserted plug 75b in the socket 65 and represents the switch plunger 77b in its pressed end position, wherein the switch spring 79b is also shown in its compressed position.

Figure 22:
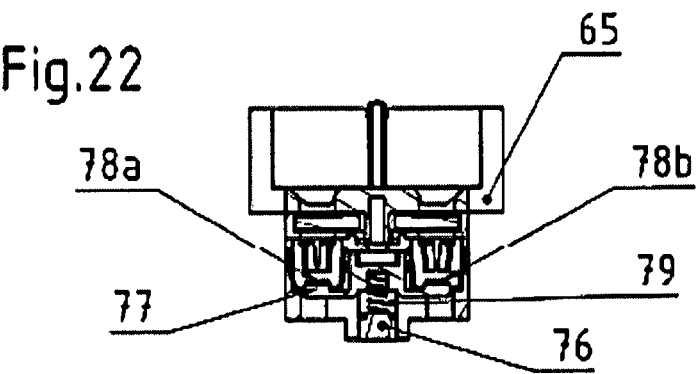
FIG. 22 shows an exemplary plug socket insert in cross section.

FIG. 22 is a cross section through a socket insert 65 that shows the arrangement of the microswitch with the switch plunger 77 and the pressure surfaces of the switch plunger 78 (a, b) as well as the compression spring 79 in the assembled state.

Figure 23:
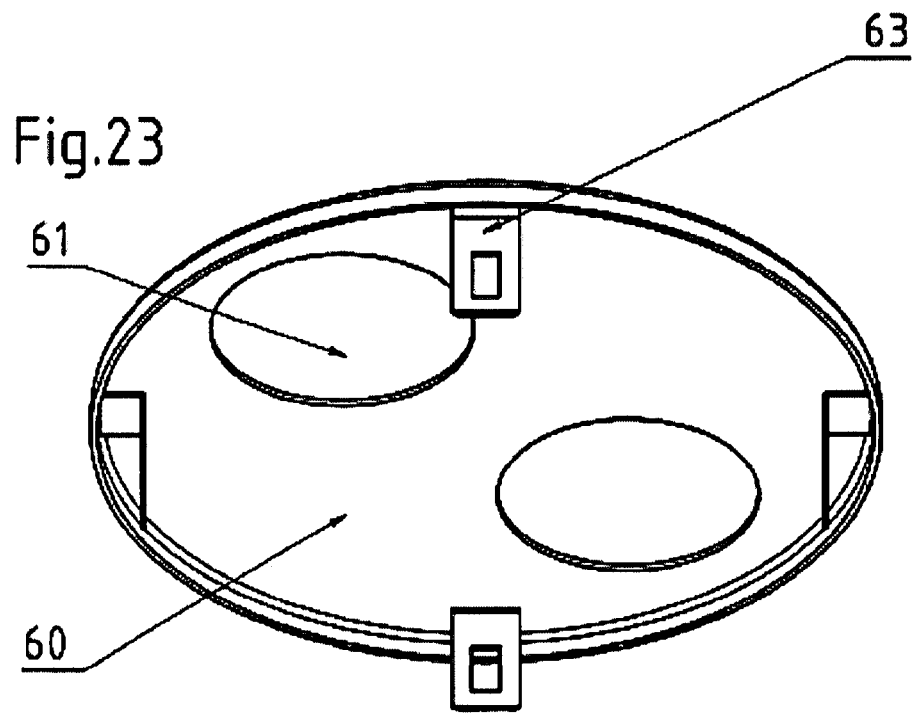
FIG. 23 shows the exemplary outer housing sub-assembly with four mounting brackets in an isometric view.

FIG. 23 shows the outer housing 60 in an isometric view from below as a sub-assembly with the four mounting brackets 63, which are fixed to the inside of the outer housing 60 and have an opening for receiving a latching element.

Figure 24:
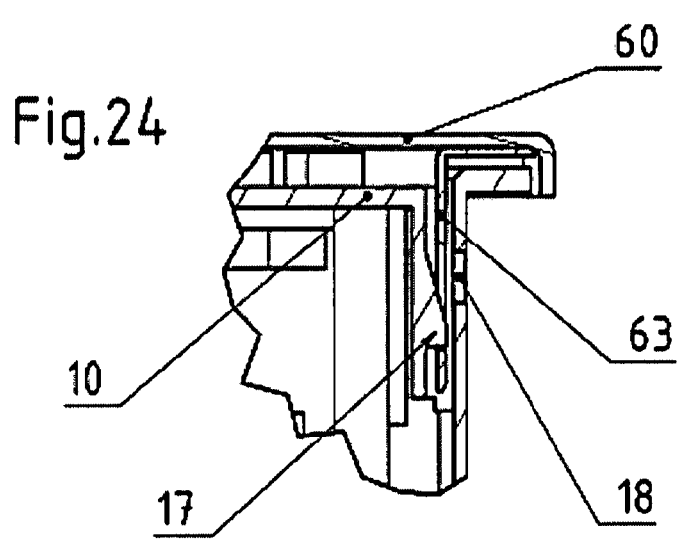
FIG. 24 shows the exemplary outer housing mounting in the base housing in a cross sectional view.

FIG. 24 is a detail cross-sectional view of the outer housing mounting when connected to the base housing 10. The latching hook 17 engages in the opening of the mounting bracket 63.

In the following, the operation of exemplary arrangements are described in more detail.

In exemplary arrangements different types of signal generation circuitry that provides at least one signal to the motor in response to at least one sensor can be used, such as sensing electric field change, capacitive change, optical change by light-dark comparison, acoustic input, radio frequency, and infrared inputs. The exemplary arrangements of the sensor circuit boards 52 and 53 are used here as examples. The sensor circuit boards 52 and 53 are arranged inside the interior area of the base housing 10 and connected to the motor control circuit board 54 via cables (the cable connections have been omitted throughout the illustrations and the figure descriptions). The exemplary circuitry is selectively operative to control the motor and selectively change the closure between the open and closed positions.

An exemplary sensor circuit board 53 comprises circuitry that represents the receiving part in a Smart Home controlled system. Commands to open or close the installation element can be input via a smartphone app or via the smart speaker in operative connection with the Smart Home system. In some arrangements the sensor circuit board 53 receives command signals via an intranet or a bus connection, or for example via the smart speaker, which sends a radio frequency signal or an infrared signal to the sensor circuit board 53. The sensor circuit board 53 responsive to the input signal, sends a control signal to the motor control circuit board 54.

Similar to the circuitry used to communicate with a smart speaker system, but much simpler in its structure, the sensor board 53 incudes circuitry that can operate as a stand-alone speech module. In this case, for example, one or two microphones can be inserted into the through holes 16 of the base housing 10 and verbal commands used to produce analogue signals can be stored and converted into digital signals via a programming button in the housing bottom (not shown), which in turn are sent as control signals to the motor control circuit board 54. The signals from the exemplary motor control circuit board cause selective operation of the motor.

Thus, data corresponding to different phonetic audible sound inputs, such as "Open" and "Closed", can be stored for different individuals before installing the installation element. This means that the opening and closing of the installation element can be assigned to a specific group of people, thus eliminating the need for an additional mechanical child safety device for the plug sockets. The motor control circuit board 54 and the sensor circuit board 53 can be installed as separate circuit boards, but it is also possible to combine both circuits in circuitry on one board, which would save additional wiring.

In exemplary arrangements in which optoelectronic signal generation is used, the sensor circuit board 52 may be integrated centrally in the closure 1. A shaped body opening 8 is provided in the closure 1 for this purpose. When using optoelectronics, a reflective light barrier or a photoelectric optical sensor, the outer housing 60 may have a central opening in which the optoelectronics is placed (the opening is not shown in the illustrations or referred to in the Figure description). If the light beam emitted is interrupted or else the light field detects a change in detectable light, the sensor detects the change and sends a control signal to the motor control circuit board 54. As in the sensor technologies described previously, this mode of operation allows the exemplary installation element to be operated in a completely contactless manner.

With capacitive sensor technology, an electric field is generated by the sensor circuitry and monitored for changes. Here also, the exemplary sensor 52, designed as a capacitive sensor, can be integrated into the closure 1. In the case of electrically conductive housing materials the capacitive sensor 52 can be designed as a touch sensor and/or can also be used as a contactless sensor with housings comprised of non-electrically conductive materials. In the touch version, a metallic outer housing 60 is connected to the sensor with a pair of wires. If the outer housing is touched at any point, the electric field changes and the sensor generates a control signal which it sends to the motor control circuit board 54. With non-contact capacitive sensor technology, it is only necessary to swipe through the electric field with a finger or the whole hand, in which case the capacitance of the electric field changes, a control signal is generated and sent to the motor circuit board 54, which causes operation of the motor.

Numerous different types of sensor technologies may be used in exemplary arrangements to control access to the sockets without use of a manually activated mechanical control unit.

After the control signal is input from the sensor circuit boards 52 or 53, the motor control circuit board 54 energizes the electric drive motor 50 and starts to rotate the rotational axle of the electric drive motor 51. On the rotational axle of the electric drive motor 51, the drive swivel connector 24 is operatively connected to the rotational axle 51 by means of the receiving hole 27. The rotation of the external thread 25 of the drive swivel connector 24 causes the movement sleeve 20 to be pulled axially into the installation element via the internal thread 21.

The exemplary closure 1, which in an exemplary arrangement is connected by means of the mounting tabs 6 (*a, b*) of the closure 1 and the connecting pins 23 (*a, b*) of the movement sleeve 20 to the movement sleeve 20 in a positive-fitting manner and rests with the stop surfaces 2 (*a, b*) of the closure 1 against the stop surfaces 11 (*a, b*) of the base housing 10, which serve as at least one release stop. This pairing and engagement of surfaces prevents rotation of the closure and movement sleeve 20 when in the closed position as the motor operates to move the closure from the closed position. The movement sleeve moves linearly into the installation element by means of the movement sleeve 20. The height matching of the release stop surfaces 11 (*a, b*) of the base housing 10 and the stop surfaces 2 (*a, b*) of the closure 1 is dimensioned in such a way that the through opening engaging portions 7 (*a, b*) of the closure 1 are axially lowered securely below the level of the through openings inside of the outer housing 60. When the rib depth of the release stop surfaces 11 (*a, b*) of the base housing 10 is exceeded by axial movement the closure 1, the closure 1 disengages the release stop and with the movement sleeve 20 can rotate into the open position below the guide ribs 14 (*a, b*) of the base housing 10 until the stop surfaces 5 (*a, b*) of the closure 1 come into contact with the open position stop ribs 13 (*a, b*) of the base housing 10. The closure 1 is thus rotated out of intermediate blocking relation of the through openings 61 and the socket inserts 65 (*a, b*), and the socket inserts 65 (*a, b*) can be used through plug engagement without restriction. The guide surfaces 3 (*a, b*) of the closure 1 slide under the guide ribs 14 (*a, b*) of the base housing and thus prevent the surface of the opening engaging portions 7 (*a, b*) of the closure 1 from being scratched.

When the closure 1 comes into contact with the open position stops, stop ribs 13 (*a, b*), the rotation of the electric drive motor 50 is stopped. The threaded connection 21 and 25 generates a slight holding torque and the current amplitude sensed by the circuitry increases to a defined value. When this value is reached, the electric drive motor 50 is switched off and its polarity is reversed in the IC circuit of the motor control circuit board 54. The plug socket elements are open for plug recess.

When a new control signal is received, the electric drive motor 50 starts rotating in the reverse direction until the stop surfaces 4 (*a, b*) of the closure 1 come into contact with the stop ribs 12 (*a, b*) of the base housing 10 which serve as closed position stops. Since the electric drive motor 50 continues to rotate but the closure 1 is prevented from turning by the stop ribs 12 (*a, b*) of the base housing 10, the transmission including the external thread 25 of the drive swivel connector 24 pushes the closure 1 in the movement sleeve 20 linearly axially towards the outer housing 60 via the internal thread 21. Thus, the through opening engaging portions 7 (*a, b*) of the closure 1 are inserted linearly from bottom to top into the through openings 61 (*a, b*) of the outer housing and form a plane overall surface with the outer surface 9 of the outer housing 60. When the closure 1 comes into contact with the outer housing 60, the current amplitude increases again to a defined value. When this value is reached and is sensed by the circuitry, the electric drive motor 50 is switched off and its polarity is reversed in the IC circuit of the motor control circuit board 54. The closure is in the closed position and access to the plug socket elements is prevented.

In another exemplary arrangement, the sensors, the movement sequence of the closure 1 and the electric drive motor 50 may be the same, except the transmission including drive swivel connector 36 and the movement sleeve 30 are designed differently. The movement sleeve 30 is a cylindrical rotary body, in the center of which is a drilled hole 34 which is used to guide the drive swivel connector 36. In the upper region of the movement sleeve 30, two connecting pins 35 are formed externally, which form a positive-fitting connection when assembled with the mounting tabs 6 (*a, b*) of the closure 1.

Two diametrically arranged helix slot structures 31 (*a, b*) are arranged in the sleeve wall, which are limited by slot ends corresponding to a top dead center 33 and a bottom dead center 32.

The exemplary drive swivel connector 36 is also a cylindrical rotary body, at the top end of which two cylindrical pins 38 (*a, b*) are formed, wherein the receiving hole 27 for the rotational axle of the electric drive motor 50 is formed centrally from below.

When assembled, the drive swivel connector 36 protrudes with its cylindrical outer wall 37 into the movement sleeve 30 and is guided axially through the inner bore by the guide surface 34.

In this exemplary arrangement the cylindrical pins 38 (*a, b*) of the drive swivel connector 36 are located in the helical slot structures 31 (*a, b*) of the movement sleeve 30. The drive swivel connector is also operatively connected to the electric drive motor.

When the closure is to be moved from the closed position to the open position the rotational axle 51 of the electric drive motor 50 starts to rotate. The rotation of the closure 1 is initially prevented by the surface pairs 2 (*a, b*) of the closure 1 in engagement with the release stops 11 (*a, b*) of the base housing 10. Rotation of the drive swivel connector 36 lowers the movement sleeve 30 linearly into the base housing 10 by means of the cylinder pins 38 (*a, b*), which move in the helical slot structures 31 (*a, b*) of the movement sleeve 30 from the bottom dead center 32 to the top dead center 33. When a sufficient axial inward movement of the closure 1 is reached, the closure is no longer held stationary by the release stops and the rotation behavior is the same as in the above-mentioned exemplary arrangement. The plug socket elements are now accessible.

From the closure open position the closing operation begins as in the previous exemplary arrangement, until the closure 1 comes into contact with the closed position stop ribs 13 (*a, b*). The drive swivel connector 36 then continues to rotate and, by means of the cylindrical pins 38 (*a, b*), moves the movement sleeve 30 linearly axially upwards through engagement with the side walls of the helical slot structures 31 (*a, b*) until the closure 1 comes into contact with the outer housing 60. As in the previous exemplary arrangement, the end position of the closure 1 is now reached. The plug socket elements are inaccessible.

A further exemplary arrangement relates to another possible implementation of the drive unit for the closure.

As shown in FIGS. 16 and 17, this exemplary motor and transmission arrangement is formed by a combination of a solenoid and a rotary magnet. The closure 1 can also be fastened via a swivel including the mounting tabs 6 (*a, b*) to the pull rod 41 of the solenoid 40 using the connecting pins 42. The solenoid 40 is fixedly connected by means of a connecting plate 47 on the rotating body of the rotary magnet 46 via the connecting bolts 48. The outer body of the rotary magnet 45 is fixed in the base housing 10 by means of lateral mounting tabs 49.

When the control signal is input, the motor control circuit board 54 first energizes the solenoid and pulls the closure axially downwards toward the base housing 10 against the compression spring 43 using the pull rod 41. Thus, the through opening engaging portions 7 (*a, b*) are lowered below the level of the through openings and the underside of the outer housing 60. The rotation of the rotary magnet 46 responsive to control circuitry starts after a time delay and turns the closure 1 towards contact with the open position stop ribs 13 (*a, b*) into the "Open" position and the motor control circuit board 54 de-energizes the magnets 40 and 45 in the end position and reverses the direction of rotation of the rotary magnet 45. The installation element is open and the sockets are plug accessible.

From the closure open position if the control signal is now input via the sensors, the solenoid 40 is re-energized and the rotary magnet 45 turns the closure 1 into a position such that the closure 1 comes to rest against the closed position stop ribs 12 (*a, b*) of the base housing 10. Now the exemplary circuitry motor control circuit board 54 de-energizes the magnets 40 and 45 in the end position and the return spring 43 of the solenoid 40 moves the closure 1 linearly axially against the outer housing 60 by means of the pull rod 41, so that the through opening engaging portions 7 (*a, b*) form a plane surface with the outer surface 9 of the outer housing 60.

To prevent incorrect operation of the closure 1 when a plug 75 is plugged in a socket, a microswitch 76 is arranged in the bottom of the socket insert 65. The microswitch 76 is designed to render the motor inoperable by providing a break contact in the circuit between the sensors 53 and the motor control circuit board 54. The engagement of the plug 75 in the exemplary socket insert 65 applies a force to the pressure surfaces 78 (*a, b*) of the switch plunger 77 by means of the plug pins of the plug 75. The switch plunger 77 is moved in the direction of the microswitch 76 so that the compression spring 79, located between the switch plunger 77 and the pressure point of the microswitch 76, is compressed and the microswitch 76 opens and switches off the sensors 53, so that no control signal can be generated as long as a plug 75 is inserted. If the plug 75 is withdrawn, the compression spring 79 relaxes and the switch 76 closes the circuit of the sensors 53 and the motor control circuit board 54. In exemplary arrangements the circuitry associated with the installation element may operate responsive to removal of the plug from the socket to cause the closure element to move from the open position to the closed position a set time after the plug is sensed as removed. Alternatively or in addition in other arrangements the control circuitry may further operate to determine that a plug has not been engaged with a socket within a time after the closure has been moved to the open position, and may cause the closure to return to the closed position. Of course it should be understood that these approaches are exemplary.

In an exemplary arrangement, the outer housing 60 is connected to the base housing 10 via fastening hooks 63. When fitted, the fastening hooks 63 of the outer housing 60 form a positive-fitting connection to the latching hooks 17 of the base housing 10. For inspection purposes and for easier disassembly during repair or recycling operations, four inspection holes 18 are located on the cylindrical outer side of the base housing 10. By inserting a suitable tool, the four latching hooks of the base housing 10 are pressed into the interior of the base housing 10 and the positive-fitting connection to the outer housing 60 is released. The outer housing can now be removed from engagement with the base housing. Of course this approach is exemplary of housing configurations that may be used.

In summary, it should be noted that exemplary arrangements provide an electrical connector installation element that does not require any manually activated mechanical control elements, opens the closure simply by, for example, moving the plug or a hand near to the installation element, and automatically closes the installation element when the plug is removed. A linear axial movement and rotational movement of the closure is implemented fully automatically and in a logical sequence. The outer surface on the housing is made more dirt-resistant, the operation is considerably simplified and the internal mechanism is protected against damage due to human error. The risk of injury during operation is reduced and the possibility of automation and integration into a Smart Home System or other control arrangement is implemented.

Thus the exemplary arrangements that have been described herein achieve improved operation, eliminate difficulties encountered in the use of prior devices and systems, and attain the useful results that are described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features and relationships are not limited to the exact features that have been shown and described.

It should be further understood that the features and/or relationships associated with one arrangement can be combined with the features and/or relationships from another arrangement. That is, various features and/or relationships from various arrangements can be combined in further arrangements. The inventive scope of the disclosure is not limited only to the exemplary arrangements that have been shown or described herein.

Having described features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

LIST OF REFERENCE NUMERALS 01 closure
02 stop surfaces for linear movement on the closure (a, b)
03 guide surface on the closure (a, b)
04 stop for "Closed" rotational movement on the closure (a, b)
05 stop for "Open" rotational movement on the closure (a, b)
06 mounting tabs on closure (a, b)
07 through opening engaging portions (a, b)
08 shaped body in the center of the closure
09 outer surface
10 base housing
11 stop surfaces for linear movement on the base housing (a, b)
12 stop rib for "Closed" rotational movement on the base housing (a, b)
13 stop rib for "Open" rotational movement on the base housing (a, b)
14 guide rib on the base housing (a, b)
15 guide opening for the movement sleeve in the base housing
16 through holes
17 latching hook 4×
18 inspection hole 4×
19 projections
20 movement sleeve with internal thread
21 internal thread
22 stop surface of movement sleeve
23 connecting pins (a, b)
24 drive swivel connector with external thread
25 external thread
26 stop surface of drive swivel
27 receiving hole for rotational axle
28 axis
29 transmission
30 movement sleeve with helix structure
31 helix structure (a, b)
32 bottom dead center of helix structure
33 top dead center of helix structure
34 guide surface for the drive swivel
35 connecting pin
36 drive swivel connector with cylindrical pin
37 guide surface of drive swivel
38 cylindrical pins (a, b)
40 outer body of solenoid (coil body)
41 pull rod
42 connecting pin
43 compression spring
45 outer body of rotary magnet
46 rotating body of rotary magnet
47 connecting plate
48 connecting bolt
49 mounting tabs
50 electric drive unit/motor
51 rotational axle of the electric drive unit
52 sensor circuit board (Hall, optoelectronic)
53 sensor circuit board (capacitive, infrared, radio)
54 motor control board
60 outer housing
61 through openings for socket access (a, b)
62 surface edge of openings (a, b)
63 latching bracket 4×
65 plug socket inserts (a, b)
70 housing bottom
75 plugs (a, b)
76 microswitch break contact
77 switch plungers (a, b)
78 pressure surfaces of switch plungers (a, b)
79 switch compression spring
90 installation element

The invention claimed is:
1. Apparatus comprising:
an electrical connector installation element including:
a housing, wherein the housing bounds an interior area,
at least one electrical plug socket in fixed operative connection with the housing and positioned in the interior area,
an outer surface, wherein the outer surface outwardly bounds the element and includes at least one opening, wherein each at least one opening
extends through the outer surface to the interior area, and is in alignment with a respective socket, whereby a plug extended through a respective opening is engageable with a respective socket,
a closure, wherein the closure
is movably mounted in operative connection with the housing, wherein the closure is rotatable about an axis and is axially movable,
is positioned axially intermediate of the at least one opening and the at least one socket,
includes at least one axially extending opening engaging portion,
wherein each opening engaging portion is configured to extend in and close a respective opening,
at least one motor, wherein the at least one motor is in operative connection with the closure,
wherein the at least one motor is operative responsive at least in part to at-receipt of control signals to cause
with the closure in a closed position wherein in the closed position the at least one opening engaging portion extends in the at least one opening, the closure member to first move axially such that the at least one opening engaging portion moves inwardly away from the at least one opening, and then to move rotationally to an open position, wherein in the open position the at least one socket is enabled to be engaged with a plug, and
with the closure in the open position, the closure member to first move rotationally such that the at least one opening engaging portion is aligned with the at least one opening, and then to move axially to the closed position, whereby the at least one socket is inaccessible from outside the housing.

2. Apparatus comprising:
an electrical connector installation element including:
a base housing,
at least one electric plug socket disposed within and in fixed operative connection with the base housing,
an outer housing, wherein the outer housing is in fixed operative connection with the base housing and extends in overlying relation of the at least one socket,
wherein the outer housing includes at least one through opening, wherein each
at least one through opening is in aligned relation with a respective socket, a closure, wherein the closure is movably mounted in operative connection with the base housing, wherein the closure is movable relative to the base housing and the outer housing both rotationally about an axis and axially along the axis, includes at least one closure projection
wherein the at least one closure projection is operative
in a closed position of the closure to extend in blocking relation of each respective through opening and aligned socket, whereby plug access to each respective socket through the respective aligned through opening is prevented, and
in an open position of the closure to be disposed inwardly axially away from the at least one through opening in the outer housing and rotationally away from each respective through opening and aligned socket, whereby plug access is enabled to each respective socket through the respective aligned through opening,
at least one motor,
wherein the at least one motor
is in operative connection with the closure, and
is operative responsive at least in part to at least one control signal to cause closure movement between the closed position and the open position.

3. The apparatus according to claim 2
wherein each at least one closure projection includes a through opening engaging portion,
wherein in the closed position each respective through opening engaging portion extends in a respective through opening.

4. The apparatus according to claim 2
wherein the outer housing is bounded outwardly on a side opposed from the base housing by an outer surface,
wherein each at least one closure projection includes a through opening engaging portion, wherein in the closed position each respective through opening engaging portion
extends in a respective through opening, and extends flush with the outer surface.

5. The apparatus according to claim 2
wherein in closure movement from the closed position to the open position the closure first moves axially and then moves rotationally to the open position.

6. The apparatus according to claim 2
wherein in closure movement from the open position to the closed position the closure first moves rotationally and then moves axially to the closed position.

7. The apparatus according to claim 2
wherein in closure movement from the closed position to the open position the closure first moves axially and then moves rotationally to the open position, and
wherein in closure movement from the open position to the closed position the closure first moves rotationally and then moves axially to the closed position.

8. The apparatus according to claim 2, and further comprising:
at least one spring, wherein when the closure is in the closed position the at least one spring is operative to axially bias the closure toward the outer housing.

9. The apparatus according to claim 2
wherein the base housing is in operative connection with at least one closed position stop,
wherein in closure movement from the open position to the closed position, the closure is first prevented from rotational movement by operative engagement with the at least one closed position stop, and then is caused to move axially toward the outer housing while being held rotationally stationary by operative engagement with the at least one closed position stop.

10. The apparatus according to claim 2
wherein the base housing is in operative connection with at least one release stop, wherein in closure movement from the closed position to the open position,
the closure is first prevented from rotational movement by operative engagement with the at least one release stop, and is caused to move axially away from the outer housing while being held rotationally stationary by operative engagement with the at least one release stop, and
being caused to move axially away from the outer housing while being held rotationally stationary by operative engagement with the at least one release stop, operatively disengages the closure and the at least one release stop wherein the closure when disengaged is enabled to move rotationally toward the open position.

11. The apparatus according to claim 2
wherein the base housing is in operative connection with at least one release stop and at least one open position stop,
wherein in closure movement from the closed position to the open position,
the closure is first prevented from rotational movement by operative engagement with the at least one release stop, and is caused to move axially away from the outer housing while being held rotationally stationary by operative engagement with the at least one release stop, and
being caused to move axially away from the outer housing while being held rotationally stationary by operative engagement with the at least one release stop, operatively disengages the closure and the at least one release stop wherein the closure when disengaged is enabled to move rotationally into operative engagement with the at least one open position stop, whereby rotational movement of the closure is stopped in the open position.

12. The apparatus according to claim 2
wherein the base housing is in operative connection with at least one closed position
stop, wherein in closure movement from the open position to the closed position,
the closure is first prevented from rotational movement in a first rotational direction by operative engagement with the at least one closed position stop, and then is caused to move axially toward the outer housing while held rotationally stationary by engagement with the at least one closed position stop,
wherein while the closure is held rotationally stationary by operative engagement with the at least one closed position stop, the closure is moved axially into adjacent relation with at least one release stop,
wherein in closure movement from the closed position to the open position,
the closure is first prevented from rotational movement in a second rotational direction opposed of the first rotational direction by operative engagement with the at least one release stop, and is caused to move axially away from the outer housing while being held rotationally stationary by operative engagement with the at least one release stop, and
wherein being caused to move axially away from the outer housing while being held rotationally stationary by operative engagement with the at least one release stop, operatively disengages the closure and the at least one release stop wherein the closure when disengaged is enabled to move in the second rotational direction toward the open position.

13. The apparatus according to claim 2, and further comprising:
at least one transmission,
wherein the at least one transmission is operatively intermediate of the at least one motor and the closure,
wherein the at least one transmission is operative to cause the closure to move axially and rotationally,
wherein the at least one transmission includes at least one of
a threaded member,
at least one helical slot,
and a solenoid.

14. The apparatus according to claim 2, and further comprising:
at least one switch, wherein the at least one switch is in operative connection with the at least one socket,
wherein in the open position of the closure, plug engagement with the at least one socket is operative to cause the at least one switch to prevent motor operation.

15. The apparatus according to claim 2, and further comprising:
at least one switch, wherein the at least one switch is in operative connection with the at least one socket,
wherein in the open position of the closure,
plug engagement with the at least one socket is operative to cause the at least one switch to prevent motor operation, and
plug disengagement from the at least one socket is operative to cause the closure to move to the closed position.

16. The apparatus according to claim 2, and further comprising:
at least one switch, wherein the at least one switch is in operative connection with the at least one socket,
wherein in the open position of the closure and with the at least one socket in plug engagement, plug disengagement is operative to cause the at least one switch to cause closure movement to the closed position.

17. The apparatus according to claim 2, and further comprising:
at least one switch, wherein the at least one switch is in operative connection with the at least one socket,
at least one circuit, wherein the at least one circuit is in operative connection with the at least one switch and the at least one motor,
wherein after the at least one closure is moved to the open position, the at least one circuit is operative responsive at least in part to the at least one switch not sensing a plug engaged with the at least one socket within a predetermined time, to cause the closure to be moved to the closed position.

18. The apparatus according to claim 2
wherein the base housing is in operative connection with at least one arcuate guide,
wherein in the open position the arcuate guide is disposed axially intermediate of the at least one closure projection and the at least one through opening.

19. The apparatus according to claim 2
wherein the closure is operatively connected to the base housing through a swivel, wherein the swivel enables movement of the closure rotationally transverse to the axis.

20. The apparatus according to claim 2, and further comprising: at least one circuit, wherein the at least one circuit
is positioned within the base housing,
is in operative connection with the at least one motor, includes at least one sensor, and
is operative responsive at least in part to the at least one sensor to produce the at least one control signal.

21. The apparatus according to claim 2, and further comprising:
at least one circuit, wherein the at least one circuit
is positioned within the base housing,
is in operative connection with the at least one motor, includes at least one sensor, and
is operative responsive at least in part to the at least one sensor to produce the at least one control signal,
wherein the at least one sensor is operative to sense at least one of
an electric field change input,
a touch contact with the outer housing,
an acoustic input,
an infrared input,
a light change, and
a radiofrequency input.

\* \* \* \* \*

UNITED STATES PATENT AND TRADEMARK OFFICE
CERTIFICATE OF CORRECTION

| | | |
|---|---|---|
| PATENT NO. | : 12,444,874 B2 | Page 1 of 1 |
| APPLICATION NO. | : 17/925364 | |
| DATED | : October 14, 2025 | |
| INVENTOR(S) | : Berthold Kalkus and Michael Konrad | |

It is certified that error appears in the above-identified patent and that said Letters Patent is hereby corrected as shown below:

In the Claims

Claim 1, Column 17, Line 4, "at-" is deleted.

Claim 2, Column 17, Line 32, "A closure, wherein the closure" begins on a new line.

Signed and Sealed this
Ninth Day of December, 2025

John A. Squires
*Director of the United States Patent and Trademark Office*